W. H. RONEY.
APPARATUS FOR MIXING OR BLENDING GRAIN.
APPLICATION FILED SEPT. 19, 1913.
1,145,215.
Patented July 6, 1915.
2 SHEETS—SHEET 1.
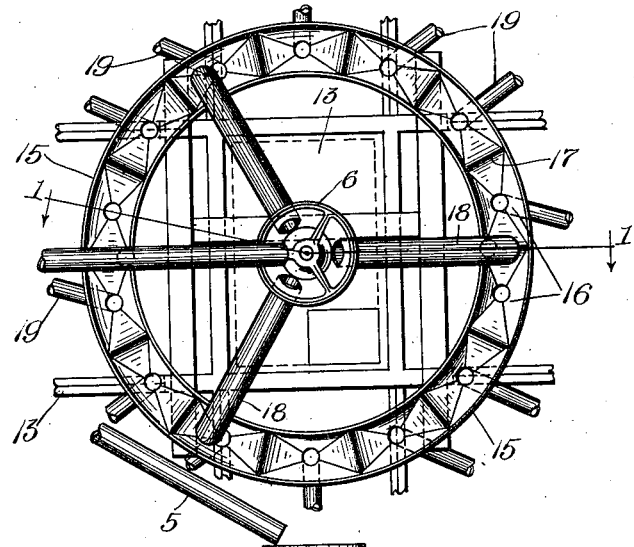
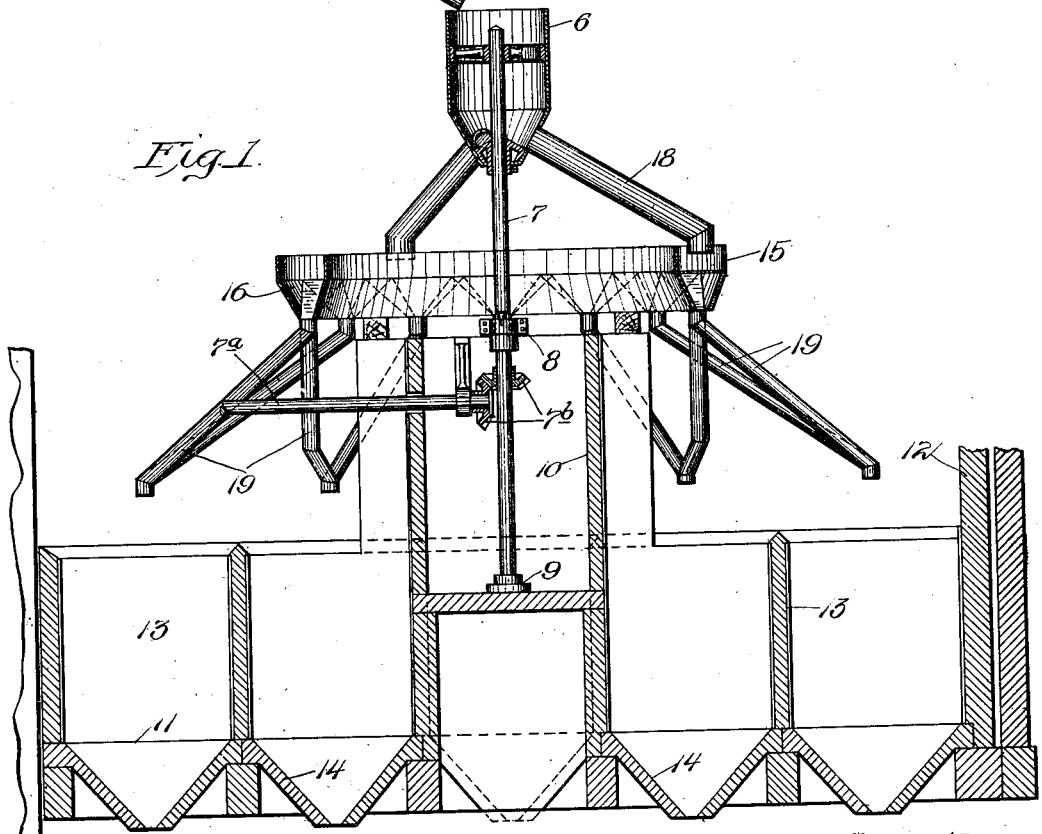
Witnesses:
Arthur Haegg.
C. Paul Carker.
Inventor:
William H. Roney.
By Luther L. Miller
Attorney.

W. H. RONEY.
APPARATUS FOR MIXING OR BLENDING GRAIN.
APPLICATION FILED SEPT. 19, 1913.
1,145,215.
Patented July 6, 1915.
2 SHEETS—SHEET 2.
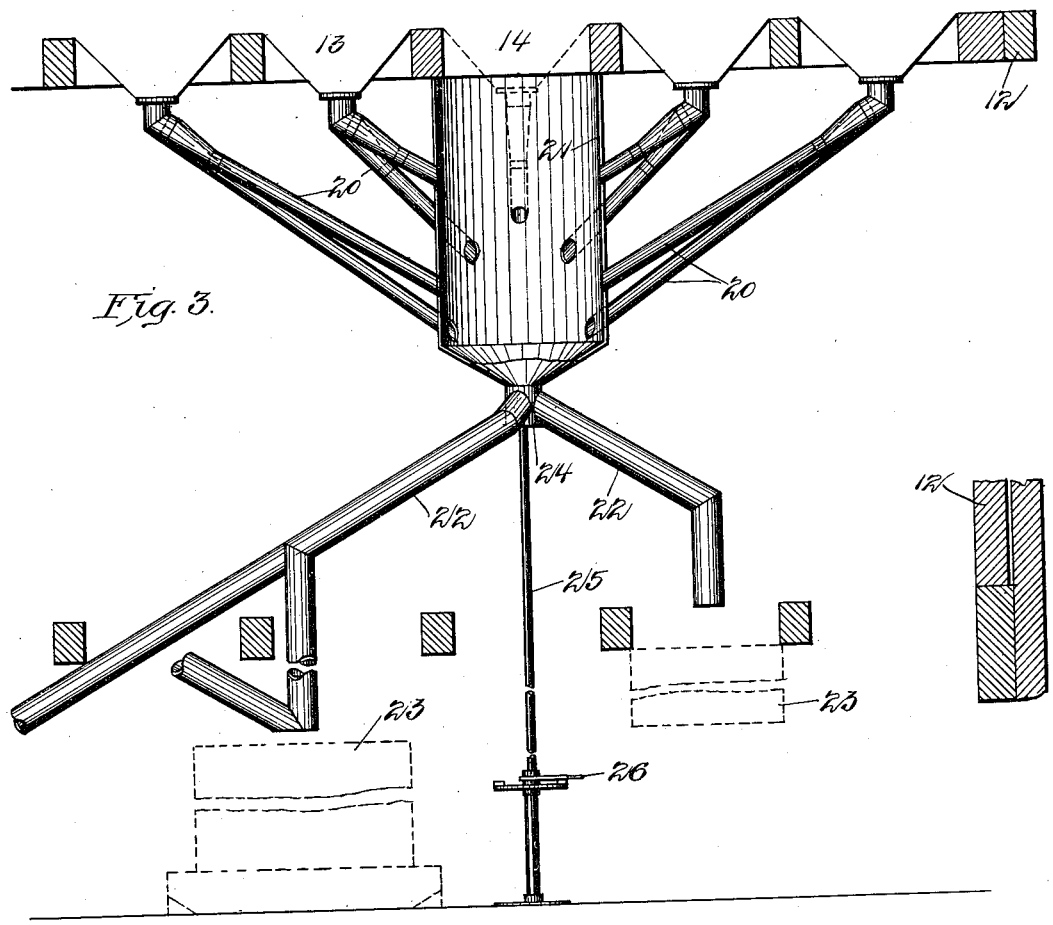
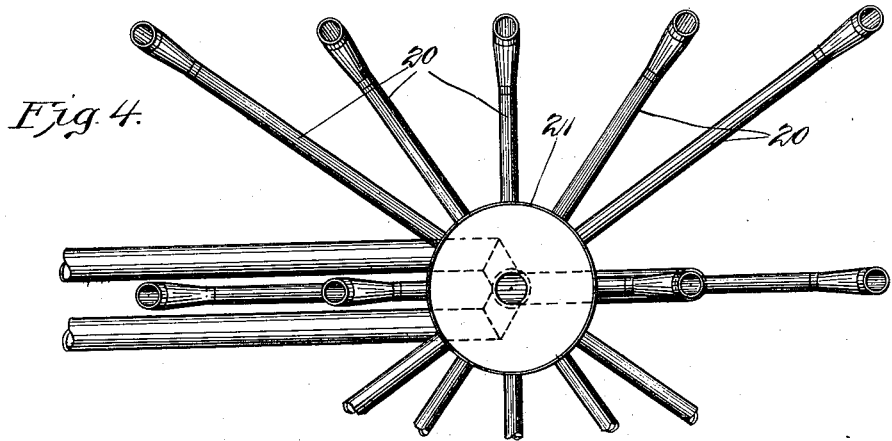
Witnesses:
Arthur Haegg.
C. Paul Parker
Inventor:
William H. Roney.
By Luther L. Miller
Attorney

UNITED STATES PATENT OFFICE.

WILLIAM H. RONEY, OF GARY, INDIANA.

APPARATUS FOR MIXING OR BLENDING GRAIN.

1,145,215.

Specification of Letters Patent.

Patented July 6, 1915.

Application filed September 19, 1913. Serial No. 790,604.

*To all whom it may concern:*

Be it known that I, WILLIAM H. RONEY, a citizen of the United States, residing at Gary, in the county of Lake and State of Indiana, have invented certain new and useful Improvements in Apparatus for Mixing or Blending Grain, of which the following is a specification.

In grain elevators or mills it is often desirable to mix together two or more batches of grain of different qualities, and in such case it is not sufficient to merely put the different batches of grain into the same bin, but it is necessary to intimately mix or blend the batches together so that a perfect and uniform mixture of even quality will result.

It is the object of my invention to produce an improved apparatus for effecting the intimate and thorough mixture of grain.

In the accompanying drawings, Figure 1 is a vertical sectional view illustrating a portion of an apparatus embodying my invention. Fig. 2 is a fragmental plan view of the parts shown in Fig. 1. Fig. 3 is a sectional view illustrating a portion of the apparatus which is positioned beneath that shown in Fig. 1. Fig. 4 is a plan view of a portion of the apparatus shown in Fig. 3.

Grain is supplied to my improved apparatus from any suitable source of supply which may be a bin or receptacle fed by an elevator leg (not shown). The grain flows from this source through a conduit 5 into a rotary hopper 6 having a funnel shape bottom. This hopper is fixed upon the upper end of a vertical rotary shaft 7 which is mounted in suitable bearings 8 and 9 in a supporting structure 10. The hopper shaft 7 may be driven from a source of power through suitable means such as a shaft 7ª and beveled gears 7ᵇ. The supporting structure 10 may be located upon one floor 11 of a building, the walls of which are indicated at 12. On said floor around the supporting structure 10 is located a series of bins 13 adapted to receive grain, the bottoms of said bins being hoppered as at 14.

Suitably supported on the structure 10 beneath the rotary hopper 6 is an annular trough 15, the bottom of which is divided into a plurality of hoppers 16. These hoppers have downwardly converging side walls, and the adjacent walls of two adjacent hoppers form a ridge 17 of inverted V-shape. A plurality of spouts 18 are fixed to rotate with the hopper 6, the upper ends of said spouts communicating with the bottom of the hopper, and the lower ends of the spouts overlying the annular trough 15, and if desired extending a short distance thereinto. Preferably, three or more of these spouts 18 are provided in order to properly balance the hopper 6 in its rotation. Grain is conducted from the individual hoppers of the annular trough 15 through a series of spouts 19, the lower ends of said spouts lying above the respective bins of the series 13.

From the hoppered bottoms of the bins 13, the grain is led through conduits 20 into a common hopper 21 from which the grain then may be led through conduits 22 to any desired place. I have herein shown the conduits as leading to cleaning mills 23. A suitable valve structure 24, located at the bottom of the hopper 21, is controlled by a shaft 25 and a handle 26 to direct the grain from the hopper 21 into the desired one of the conduits 22.

In use, grain is supplied to the rotary hopper 6 through the conduit 5 and passes from said hopper through the spouts 18 into the annular trough 15. Inasmuch as the spouts 18 are constantly rotating with the hopper 6, the grain will be evenly distributed about the annular trough 15 and will pass from said trough through the spouts 19 into the separate bins 13. Since the lower ends of the spouts 18 at all times overlie the trough 15, and owing to the hoppered construction of said trough and the ridges 17 between the individual hoppers, no grain will be spilled or lost from the spouts 18, but the grain will certainly be discharged into one or another of the hoppers 16 of said annular trough. From the bins 13 the grain which has been thus scattered or separated is again collected through conduits 20 into the common hopper 21 from which it may, if desired, be led to a suitable cleaning mill. This apparatus accomplishes effectively a thorough and intimate mixing or blending of grain. It will be noted that the apparatus is simple in construction and durable, so that it is not likely to get out of order.

While I have herein disclosed that embodiment of my invention which I prefer, it should be understood that I do not thereby intend to limit the appended claims to the exact form shown in the drawings.

I claim as my invention:

1. A grain-blending apparatus comprising a rotary hopper, a stationary arcuate trough divided into a plurality of compartments, and providing a dividing ridge between each two adjacent compartments, and a spout communicating at its upper end with said hopper and arranged to rotate therewith, the lower end of said spout overlying said trough.

2. A grain-blending apparatus comprising a hopper mounted for rotation continuously in one direction, a stationary series of hoppers arranged in a circle in a plane beneath the first-mentioned hopper, and spouts leading from and rotating with the first-mentioned hopper and having their lower ends overlying said series of hoppers.

3. In an apparatus for blending grain, the combination of a series of bins, a series of hoppers located above said bins and arranged on the arc of a circle, spouts leading from said hoppers and discharging into the respective bins, a rotary hopper, and a spout rotating with said hopper and arranged to conduct grain therefrom and discharge it into said annular series of hoppers.

4. In an apparatus for blending grain, the combination of a horizontally arranged series of bins, an annular trough positioned above said bins and having its bottom divided into a plurality of hoppers, spouts leading from said hoppers and arranged to discharge grain into the respective bins, a rotary hopper positioned in a plane above said trough, and spouts rotating with said hopper and having their upper ends communicating therewith, the lower ends of said spouts overlying said trough.

5. In an apparatus for blending grain, the combination of a rotary hopper, a spout leading therefrom and rotating therewith, stationary receiving means positioned beneath the path of the lower end of said spout to receive grain therefrom continuously during the travel of the spout, a plurality of receptacles positioned beneath said receiving means, and conduits leading from said means and arranged to discharge into the respective receptacles.

6. In a grain-blending apparatus, the combination of a rotary hopper having a funnel shape bottom, a spout communicating with the bottom of the hopper and arranged to rotate therewith, a receptacle arranged on the arc of a circle beneath the path of the lower end of said spout, a plurality of bins beneath said receptacle, and conduits leading from said receptacle to said bins.

7. In a grain-blending apparatus, the combination of a hopper, a discharge spout leading therefrom and arranged to travel in a definite path, a receptacle arranged beneath the path of said spout to receive grain therefrom, a plurality of conduits leading from said receptacle, and means to receive grain from said conduits.

8. In a grain-blending apparatus, the combination of a hopper, a discharge spout communicating therewith and arranged to travel on the arc of a circle, an arcuate trough positioned beneath the path of the lower end of said spout, a plurality of conduits leading from different points along said trough, and means to receive grain from said conduits.

9. In a grain-blending apparatus, in combination, a receptacle having a plurality of conduits leading from different points therein, means to discharge grain into said receptacle, a series of separate bins to receive grain from said conduits, and a common hopper communicating with all of said bins.

10. In a grain-blending apparatus, in combination, a series of receptacles, means for continuously supplying grain equally to said receptacles, a plurality of bins, conduits leading from the receptacles to the respective bins, and a common hopper arranged to receive grain from all of said bins.

11. In a grain-blending apparatus, the combination of a stationary system of hoppers and communicating conduits arranged to provide a plurality of separate fixed paths for the grain, a movably mounted grain-containing element arranged to distribute the grain into the various paths, and a receptacle arranged to receive the blended grain from all of said paths.

12. In a grain-blending apparatus, the combination of a stationary system of hoppers and communicating conduits arranged to provide a plurality of separate fixed paths for the grain, a rotary hopper, a discharge spout communicating with said hopper and arranged to distribute the grain therefrom into said paths, and a receptacle arranged to receive the distributed grain from all of said paths.

In testimony whereof I affix my signature in the presence of two witnesses.

WILLIAM H. RONEY.

Witnesses:
  WILLIAM C. GEAKE,
  DELLA CRONKHITE,